(12) United States Patent
Harada et al.

(10) Patent No.: US 11,457,493 B2
(45) Date of Patent: Sep. 27, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/760,327

(22) PCT Filed: Nov. 2, 2017

(86) PCT No.: PCT/JP2017/039783
§ 371 (c)(1),
(2) Date: Apr. 29, 2020

(87) PCT Pub. No.: WO2019/087360
PCT Pub. Date: May 9, 2019

(65) Prior Publication Data
US 2020/0344834 A1    Oct. 29, 2020

(51) Int. Cl.
*H04W 76/19*    (2018.01)
*H04B 7/0491*    (2017.01)
*H04W 76/38*    (2018.01)

(52) U.S. Cl.
CPC .......... *H04W 76/19* (2018.02); *H04W 76/38* (2018.02)

(58) Field of Classification Search
CPC . H04W 76/19; H04W 76/38; H04W 36/0069; H04W 36/305; H04W 76/34; H04W 76/15; H04W 24/04; H04W 76/18; H04B 7/0695; H04B 7/088; H04B 17/19;
(Continued)

(56) References Cited

U.S. PATENT DOCUMENTS

| 10,680,700 B2* | 6/2020 | Chakraborty | ......... H04W 76/18 |
| 2009/0021411 A1* | 1/2009 | Maruyama | ............. H04N 5/374 341/155 |
| 2012/0281548 A1 | 11/2012 | Lin et al. | |

(Continued)

FOREIGN PATENT DOCUMENTS

| EP | 2 866 374 A1 | 4/2015 |
| JP | 2014514821 A | 6/2014 |

OTHER PUBLICATIONS

International Search Report issued in Application No. PCT/JP2017/039783, dated Dec. 12, 2017 (5 pages).
(Continued)

*Primary Examiner* — Andrew Wendell
(74) *Attorney, Agent, or Firm* — Osha Bergman Watanabe & Burton LLP

(57) ABSTRACT

In order to control communication operations properly in a secondary cell even when a beam failure and/or a BR failure occur in the secondary cell, a user terminal, according to one aspect of the present disclosure, has a control section that controls adjustment of a deactivation timer for a certain secondary cell and/or indication of a beam failure and/or a beam recovery (BR) failure in the certain secondary cell, based on the beam failure and/or a result of BR in the certain secondary cell, and a transmission section that transmits information about the beam failure and/or the BR failure in the certain secondary cell by using another cell.

6 Claims, 13 Drawing Sheets

(58) Field of Classification Search
CPC ........ H04B 17/11; H04B 7/0408; H04B 7/14; H04L 5/0098
See application file for complete search history.

(56) References Cited

U.S. PATENT DOCUMENTS

| | | | |
|---|---|---|---|
| 2015/0117181 A1 | 4/2015 | Lee | |
| 2015/0256300 A1 | 9/2015 | Lin et al. | |
| 2018/0278467 A1* | 9/2018 | John Wilson | H04W 72/046 |
| 2018/0367374 A1* | 12/2018 | Liu | H04L 5/0023 |
| 2019/0037498 A1* | 1/2019 | Tseng | H04W 52/0219 |
| 2019/0053288 A1* | 2/2019 | Zhou | H04W 74/006 |
| 2019/0110281 A1* | 4/2019 | Zhou | H04B 7/088 |
| 2019/0253127 A1* | 8/2019 | Kang | H04B 7/0617 |
| 2022/0060244 A1* | 2/2022 | Xia | H04B 7/0834 |

OTHER PUBLICATIONS

Written Opinion issued in International Application No. PCT/JP2017/039783, dated Dec. 12, 2017 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG-RAN WG2#99bis; R2-1710560; "RLF for NR;" Huawei, HiSilicon; Aug. 9-13, 2017; Prague, Czech Republic (6 pages).
3GPP TSG-RAN WG2 #88; R2-145287; "S-RLF indication from MeNB to SeNB;" Kyocera, Pantech; Nov. 17-21, 2014; San Francisco, USA (6 pages).
Extended European Search Report in counterpart European Application No. 17930235.1 dated May 27, 2021 (10 pages).
Samsung; "NR RLM and RLF procedure"; 3GPP TSG-RAN WG2 Meeting #99bis, R2-1711414; Prague, Czech; Oct. 9-13, 2017 (3 pages).
NTT Docomo, Inc.; "Discussion on NR RLM and RLF"; 3GPP TSG RAN WG1 Meeting NR AH#3, R1-1716076; Nagoya, Japan; Sep. 18-21, 2017 (4 pages).
NTT Docomo; "Views on beam recovery"; 3GPP TSG RAN WG1 Meeting NR#3, R1-1716083; Nagoya, Japan; Sep. 18-21, 2017 (9 pages).
NTT Docomo, Inc.; "Discussion on S-RLF"; 3GPP TSG-RAN WG2 Meeting #99, R2-1709658; Berlin, Germany; Aug. 21-25, 2017 (3 pages).
Nokia et al.; "Further considerations on UE measurements upon S-RLF"; 3GPP TSG-RAN WG2 #99, R2-1709246; Berlin, Germany; Aug. 21-25, 2017 (3 pages).
Huawei et al.; "CA Activation-Deactivation in NR"; 3GPP TSG-RAN WG2 Meeting #98, R2-1704866; Hangzhou, China; May 15-19, 2017 (3 pages).
Office Action issued in Japanese Application No. 2019-550099; dated Jan. 5, 2022 (6 pages).

* cited by examiner

FIG. 5

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specifications of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th Generation mobile communication system)," "5G+ (plus)," "NR (New Radio)," "NX (New radio access)," "FX (Future generation radio access)," "LTE Rel. 14 or 15 and later versions," etc.).

In existing LTE systems (LTE Rel. 8 to 13), the quality of a radio link is subject to monitoring (RLM (Radio Link Monitoring)). When a radio link failure (RLF) is detected based on RLM, a user terminal (UE (User Equipment)) is required to re-establish the RRC (Radio Resource Control) connection.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 or later versions, NR, 5G, etc.), research is underway to carry out communication by using beamforming (BF). Also, in order to prevent radio link failures (RLFs) from occurring, studies are underway to perform procedures for switching to other beams (also referred to as "beam recovery (BR)") when the quality of a particular beam deteriorates.

Furthermore, research is underway to control radio link monitoring (RLM) based on the results of BR. Meanwhile, although RLM control to use the results of BR for specific cells (for example, primary cells and/or the like) is under study, how to use beam failures and/or the results of BR to control communication in secondary cells has not been studied yet.

It is therefore an object of the present disclosure to provide a user terminal and a radio communication method, whereby communication operations in secondary cells can be controlled properly even when beam failures and/or BR failures occur in secondary cells.

Solution to Problem

One aspect of the present disclosure provides a user terminal, which has a control section that controls adjustment of a deactivation timer for a certain secondary cell and/or indication of a beam failure and/or a beam recovery (BR) failure in the certain secondary cell, based on the beam failure and/or a result of BR in the certain secondary cell, and a transmission section that transmits information about the beam failure and/or the BR failure in the certain secondary cell by using another cell.

Advantageous Effects of Invention

According to one aspect of the present disclosure, even when beam failures and/or BR failures occur in secondary cells, communication operations in secondary cells can be controlled properly.

BRIEF DESCRIPTION OF DRAWINGS

FIG. 5 is a diagram to show an example of MAC CEs for use for reporting the results of BR;

DESCRIPTION OF EMBODIMENTS

Figure 1:
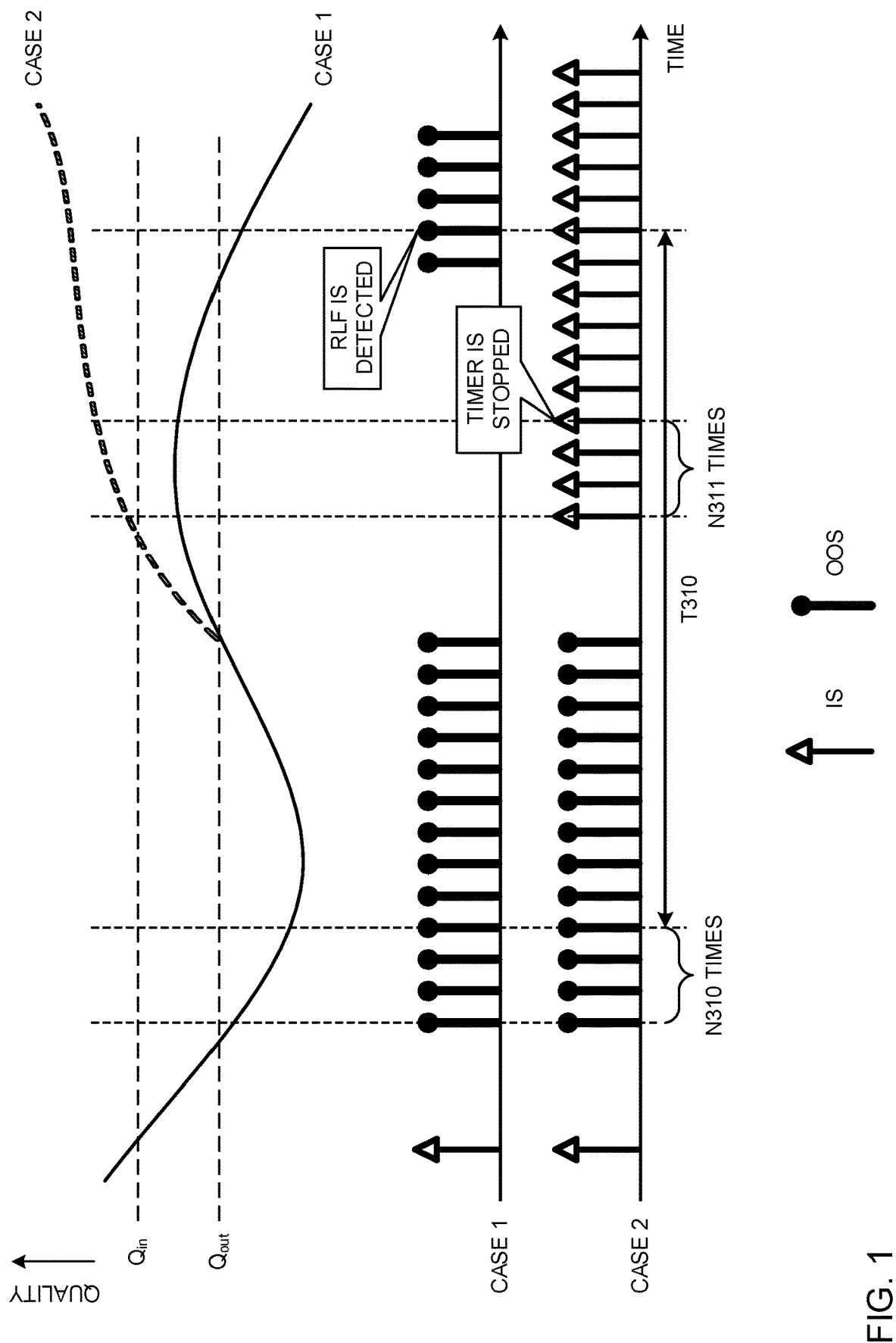
FIG. 1 is a schematic diagram, in which RLF is detected based on IS/OOS.

Future radio communication systems (for example, LTE Rel. 14 or later versions, NR or 5G, etc.) are under study to carry out communication using beamforming (BF).

For example, beams that are used by a user terminal and/or a radio base station (for example, a gNB (gNodeB)) may include beams that are used to transmit signals (also referred to as "transmitting beams," "Tx beams," etc.), beams that are used to receive signals (also referred to as "receiving beams," "Rx beams," etc.) and so forth. A pair of a transmitting beam of the transmitting end and a receiving beam of the receiving end may be referred to as a "beam pair link (BPL)."

In an environment to use BF, a radio link is more susceptible to the impact of obstacle-induced blockage, and therefore the quality of the radio link is more likely to deteriorate. There is a danger that, if the quality of a radio link deteriorates, radio link failures (RLFs) might occur frequently. Since it is necessary to re-connect with cells when an RLF occurs, frequent occurrence of RLFs might lead to a decline in system throughput.

For this reason, the method of radio link monitoring (RLM) for future radio communication systems is being discussed. For example, envisaging future radio communication systems, research is underway to support one or more downlink signals for RLM (also referred to as "DL-RSs (Reference Signals)" or the like).

Resources for the DL-RSs (DL-RS resources) may be associated with resources and/or ports for synchronization signal blocks (SSBs) or channel state measurement RSs (CSI-RSs (Channel State Information RSs)). Note that SSBs may be referred to as "SS/PBCH (Physical Broadcast CHannel) blocks" and the like.

The DL-RSs may include at least one of the primary synchronization signal (PSS), secondary synchronization signal (SSS), mobility reference signal (MRS), CSI-RS, demodulation reference signal (DMRS), beam-specific signal and so forth, or may be signals that are formed by enhancing and/or modifying these signals (for example, signals formed by changing the density and/or the cycle of the above signals).

A user terminal may be configured, by higher layer signaling, to perform measurements using DL-RS resources. In this case, the assumption is that the user terminal, where such measurements are configured, determines whether a radio link is in a synchronous state (IS (In-Sync)) or in an asynchronous state (OOS (Out-Of-Sync)), based on measurement results in DL-RS resources. Default DL-RS resources to allow the user terminal to conduct RLM in the event no DL-RS resource is configured from a radio base station may be set forth in the specification.

When the quality of a radio link estimated (or "measured") based at least on one DL-RS resource that is configured exceeds a certain threshold (for example, $Q_{in}$), the user terminal may judge that the radio link is in IS.

When the quality of a radio link estimated based at least on one DL-RS resource that is configured falls below a certain threshold (for example, $Q_{out}$), the user terminal may judge that the radio link is in OOS. Note that the radio link quality here may correspond to, for example, the block error rate (BLER) of a hypothetical PDCCH.

IS and/or OOS, which are judged at regular intervals (periodically), may be referred to as "periodic IS (P-IS)/ periodic OOS (P-OOS)." For example, IS/OOS to be judged using RLM-RSs may be P-IS/OOS.

In existing LTE systems (LTE Rel. 8 to 13), IS and/or OOS (IS/OOS) are indicated from the physical layer to higher layers (for example, the MAC layer, the RRC layer, etc.) in a user terminal, and RLF is detected based on the IS/OOS indication.

To be more specific, when a user terminal receives an OOS indication for a certain cell (for example, the primary cell) a certain number of times (for example, N310 times), the user terminal will activate (start) a timer T310. When the user terminal receives an IS indication for the certain cell N311 times while the timer T310 is running, the user terminal will stop the timer T310. When the timer T310 expires, the user terminal judges that RLF has been detected with respect to this certain cell.

Note that the names "N310," "N311," "T310" and others are by no means limiting. T310 may be referred to as the "timer for RLF detection" or the like. N310 may be referred to as "the number of times OOS is indicated before timer T310 is activated" or the like. N311 may be referred to as "the number of times IS is indicated before the timer T310 is stopped" or the like.

FIG. 1 is a schematic diagram in which RLF is detected based on IS/OOS. This drawing assumes that N310=N311=4. T310 shows the period from the activation of timer T310, to its expiration, but does not show a timer counter.

The upper part of FIG. 1 shows two cases (case 1 and case 2) in which the estimated quality of a radio link changes. The lower part of FIG. 1 shows IS/OOS indications corresponding to the above two cases.

In case 1, first, OOS occurs N310 times, and the timer T310 starts. After that, T310 expires while the radio link quality does not exceed the threshold $Q_{in}$, and therefore RLF is detected.

In case 2, although the timer T310 starts as in case 1, following this, the radio link quality exceeds the threshold $Q_{in}$ and IS occurs N311 times, and so T310 stops.

Now, envisaging future radio communication systems (for example, LTE Rel. 14 or later versions, NR, 5G, etc.), research is underway to execute procedures for switching to other beams (which may be referred to as "beam recovery (BR)," "L1/L2 beam recovery," etc.), when the quality of a particular beam deteriorates, so as to prevent RLF from occurring.

As mentioned earlier, RLF is detected by controlling RS measurements in the physical layer and the activation and expiration of timers in higher layers, and, in addition, recovery from RLF should follow the same procedures as random access. Meanwhile, there is an expectation that the procedures for switching to other beams (BR and L1/L2 beam recovery) will be made simpler than the recovery from RLF, at least in part of the layers.

The BR procedures may be triggered by a beam failure. Here, a beam failure, as used in this context, may indicate, for example, that one, several or all of the control channels have not been detected in UE and/or a base station for a certain period, or that the measurement result of the received quality of a reference signal linked with a control channel has failed to fulfill certain quality.

Figure 2:
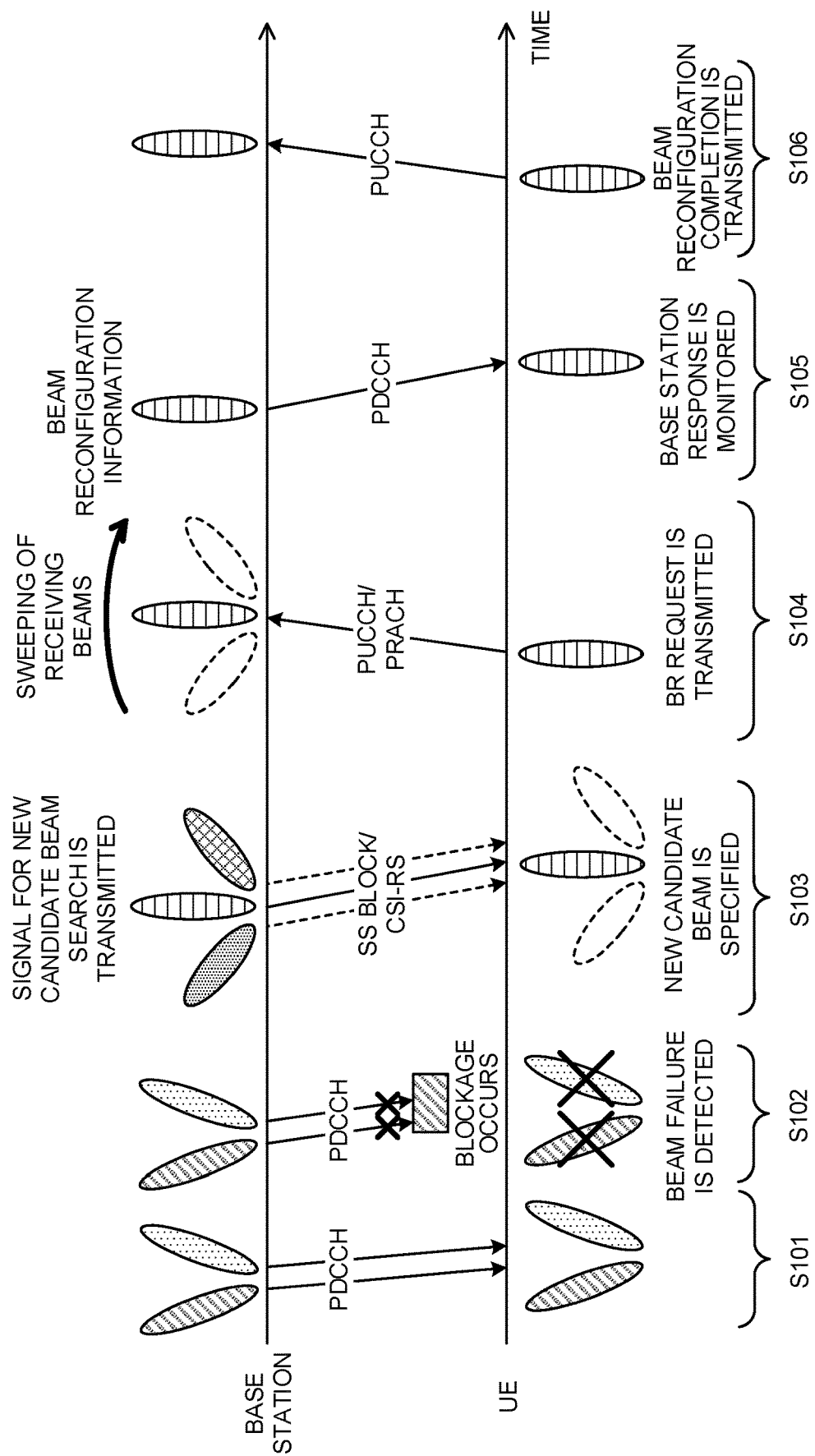
FIG. 2 is a diagram to show an example of beam recovery procedures.

FIG. 2 are diagrams to show examples of beam recovery procedures. The number of the beams and the like are simply examples and not limiting. In the initial state shown in FIG. 2 (step S101), a user terminal receives a downlink control channel (PDCCH (Physical Downlink Control CHannel)), which is transmitted from a radio base station using two beams.

In step S102, the radio wave from the radio base station is blocked, and so the user terminal is unable to detect the PDCCH. Such blocking might occur due to, for example, the impact of obstacles between the user terminal and the radio base station, fading, interference and so forth.

The user terminal detects a beam failure when a certain condition is fulfilled. The radio base station may judge that the user terminal has detected a beam failure when no indication arrives from the user terminal, or the radio base station may judge that a beam failure has been detected when a certain signal (the beam recovery request in step S104) is received from the user terminal.

In step S103, the user terminal starts a search for new candidate beams, to use newly for communication, for beam recovery. To be more specific, upon detecting a beam failure, the user terminal performs measurements based on pre-configured DL-RS resources, and identifies one or more new candidate beams that are desirable (that have good quality, for example). In this example, one beam is specified as a new candidate beam.

In step S104, the user terminal, having identified a new candidate beam, transmits a beam recovery request (beam recovery request signal). The beam recovery request may be transmitted, by using, for example, at least one of an uplink control channel (PUCCH (Physical Uplink Control CHannel)), a random access channel (PRACH (Physical Random Access CHannel)), and a UL grant-free PUSCH (Physical Uplink Shared CHannel).

The beam recovery request may include information about the new candidate beam identified in step S103. The resource for the beam recovery request may be associated with the new candidate beam. Information about the beam may be indicated by using, for example, a beam index (BI), a certain reference signal's port and/or resource index (for example, CSI-RS resource indicator (CRI)), and so forth.

In step S105, the radio base station, having detected the beam recovery request, transmits a response signal in response to the beam recovery request from the user terminal. This response signal may contain reconfiguration information (for example, configuration information of DL-RS resources) related to one or more beams. The response signal may be transmitted, for example, in a user terminal-common search space in the PDCCH. The user terminal may determine which transmitting beam and/or receiving beam is to use based on the beam reconfiguration information.

In step S106, the user terminal may transmit, to the radio base station, a message to indicate that beam reconfiguration has been completed. This message may be transmitted by using a PUCCH, for example.

A successful beam recovery (BR success) may refer to, for example, the case of arriving at step S106. Meanwhile, a beam recovery failure (BR failure) refers to the case in which the procedures do not reach step S106 (for example, a case where not a single candidate beam is specified in step S103).

For example, in a multi-beam operation scenario, the user terminal might be configured to perform both RLM for beams and beam recovery. Here, research is underway to judge IS/OOS, as described above, in association with the results of BR (BR failure and/or BR success) in a certain cells (for example, primary cells).

For example, the occurrence of a BR failure may be judged as an indication of OOS. OOS, which is linked with BR failure, may be referred to as "aperiodic OOS (A-OOS)." The occurrence of a BR success may be judged as an indication of IS. IS, which is linked with BR success, may be referred to as "aperiodic IS (A-IS)."

In this way, in future radio communication systems, research is underway to control the above-described timer T310 and judge RLF based on A-OOS and/or A-IS. Meanwhile, when RLM is carried out using the results of BR, controlling communication operations (for example, re-establishing connections) based on RLF detection presumes certain cells (primary cells, PSCells, etc.). That is, how to use beam failures and/or the results of BR in secondary cells (SCells) to control communication has not been studied yet, and appropriate operations are in demand.

The present inventors have focused on the fact that UE is unable to communicate properly in a secondary cell where a BR failure has occurred, and come up with the idea of controlling certain operations (for example, deactivation operation) for the secondary cell based on the results of BR (for example, BR failure). For example, the present inventors have come up with the idea of adjusting a deactivation timer for a secondary cell and/or controlling the indication of BR results (for example, BR failure) based on the results of BR.

Also, the present inventors have focused on the fact that, when BR procedures cannot be performed, UE is unable to communicate properly in a secondary cell where a beam failure has occurred, and come up with the idea of controlling certain operations for the secondary cell (for example, deactivation operation and/or monitoring of other beams) based on beam failures. For example, the present inventors have come up with the idea of adjusting a deactivation timer for a secondary cell and/or controlling the indication of beam failures based on beam failures.

Alternatively, to another example of the present invention, the present inventors have come up with the idea of using a configuration in which beam failures that have occurred in a secondary cell and/or the results of BR are not used to control the deactivation operation for the secondary cell.

Now, embodiments according to the present disclosure will be described below in detail with reference to the accompanying drawings. The herein-contained embodiments may be used individually, or may be used in combination. Also, in the following description, the results of BR may be replaced with both of "BR success" and "BR failure," or may be replaced with either "BR success" or "BR failure." Also, although cases will be described in the following description in which the secondary cells do not include the PUCCH SCell that carries out PUCCH transmission and/or the PSCell that is used in DC, the secondary cells are by no means limited to these.

First Example

With a first example of the present invention, a case will be described in which the results of BR in a secondary cell are not applied to certain operations in the secondary cell (for example, deactivation operation and/or RLM).

In this case, a user terminal (UE) may exert control so that, even if BR succeeds or fails in the secondary cell, no additional operation is carried out based on this result of BR. For example, the UE applies the deactivation operation defined in existing systems (for example, Rel. 13 or earlier versions) in the secondary cell, regardless of the result of BR. Alternatively, the UE may not assume to be configured to perform BR operation in the secondary cell.

Note that the UE may control aperiodic IS/OOS indication (RLM operation) in a certain cell (for example, a primary cell, a PUCCH SCell, or a PS Cell) based on the results of BR.

In this way, a secondary cell is configured not to perform additional operations based on the results of BR, the same control as in existing systems can be used regardless of the result of BR.

Second Example

With a second example of the present invention, a case will be described in which the deactivation operation of a secondary cell is controlled by adjusting a certain timer for the secondary cell based on the results of BR (BR success and/or BR failure) in the secondary cell. With the following description, a case will be illustrated in which the certain timer is a deactivation timer (for example, sCellDeactivationTimer), but the timer that can be applied is not limited to this, and other timers may be applied as well.

Figure 3:
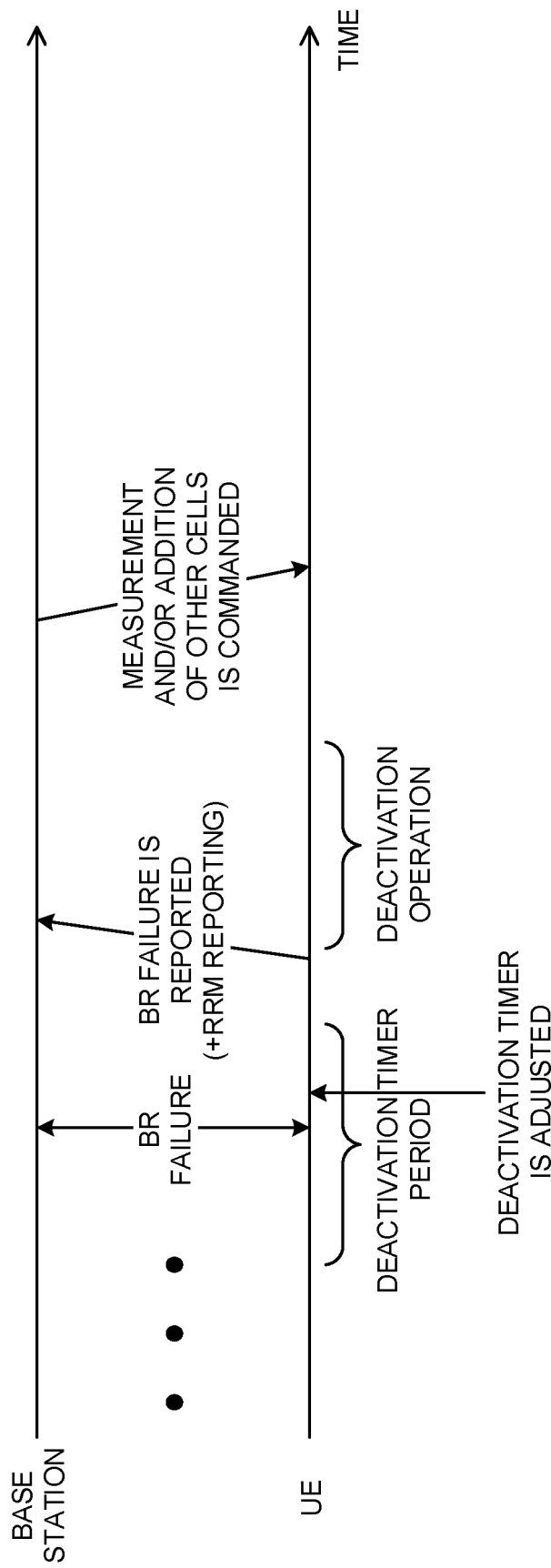
FIG. 3 is a diagram to show an example of deactivation operation in a secondary cell.

When a BR failure occurs in a certain secondary cell (SCell), the UE adjusts the deactivation timer for this certain SCell (see FIG. 3). For example, the UE changes the deactivation timer that is running, to expire earlier in response to a BR failure. To illustrate an example, if the deactivation timer is to expire when it reaches a certain count value, the deactivation timer increments its count value by a certain value (for example, N) when a BR failure is detected, and goes on counting.

If the deactivation timer for the certain SCell expires, the UE performs the deactivation operation for the certain SCell. That is, when a BR failure occurs in the certain SCell, the deactivation timer is incremented, so that it is possible to shorten the period until the certain SCell shifts to a deactivated state. By this means, an SCell, where the communication environment is poor for the UE (an SCell where a BR failure has occurred), can quickly shift to a deactivated state, and the UE can be configured not to communicate in this SCell. By this means, it is possible to prevent the UE from performing unnecessary communication.

Figure 4:
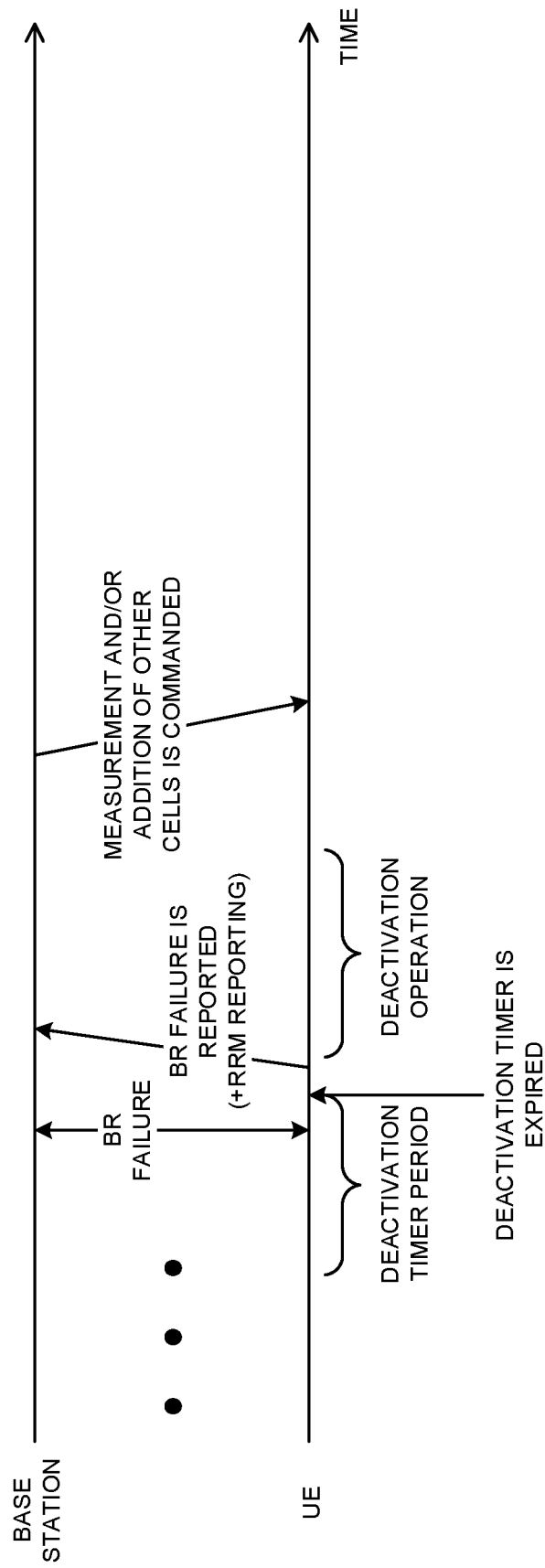
FIG. 4 is a diagram to show another example of deactivation operation in a secondary cell.

Alternatively, when a BR failure occurs in a certain SCell, the UE may adjust the deactivation timer for this certain SCell to expire (see FIG. 4). By this means, when a BR failure occurs, it is possible to shorten the period until the certain SCell shifts to a deactivated state.

When the deactivation timer expires, the UE may send an indication (or a report) to the base station by using other cells (see FIG. 3 and FIG. 4). These other cells may be at least one of a primary cell, a PUCCH SCell, a PSCell, and other SCells that are available for use (for example, an SCell in an active state). By using other cells, it is possible not to use the certain SCell where the quality of communication is poor, and to send a report to the base station.

The information which the UE indicates (or reports) to the base station may include information about the results of BR (for example, BR failure) for the certain SCell, or include information to indicate that the deactivation timer is expired based on the results of BR. Alternatively, the UE may report the measurement results for other cells and/or other carriers (for example, other CCs) to the base station, in addition to the information about the BR failure in the certain SCell. The measurement results may be referred to as a "measurement report" or an "RRM report."

The UE may be configured to perform RRM measurements for the certain SCell and for other cells and/or other carriers in advance, when reporting the measurement results for other cells and/or other carriers to the base station. Also, if the measurement results (measurement report) are reported by using other cells, the information about the BR failure in the certain SCell may be reported as part of the measurement report.

The UE sends the indication (or report) to the base station by using at least one of higher layer signaling, MAC signaling and uplink control information (UCI).

<Higher Layer Signaling>

The UE reports the information about the BR failure or the combination of the information about the BR failure and the measurement report, to the base station, by using higher layer signaling (for example, RRC signaling). In particular, when reporting the combination of the information about the BR failure and the measurement report, it is preferable to apply RRC signaling, because of the large amount of information.

<MAC CE>

When using MAC control information (MAC CE (Media Access Control Control Element)) to report BR failures in the certain SCell, MAC CEs for reporting BR failures may be newly defined. Also, a MAC subheader for reporting BR failures (LCID (Logical Channel IDentifier)) may be newly defined.

Figure 5:
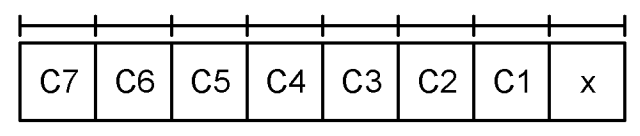

FIG. 5 is a diagram to show an example of MAC CEs for use for transmitting a BR failure report. In FIG. 5, given Ci (here, i=1 to 7), i corresponds to the secondary cell index (sCellIndex). When Ci is indicated as 1, this means that a BR failure occurs with respect to SCell #i. Note that, when Ci is indicated as 0, this might mean that a BR success occurs with respect to SCell #i. Furthermore, by increasing the length of MAC CEs, it is possible to support a larger number of CCs (secondary cells) in carrier aggregation (CA).

<UCI>

The UE may include information about BR failures, or the combination of information about BR failures and a measurement report, in uplink control information (UCI), and indicate this information to the base station. The UCI is allocated to an uplink control channel (PUCCH) or an uplink shared channel (PUSCH) and transmitted. In this case, the UCI feedback type may be newly defined for reporting BR failures. For example, although a CQI feedback type, a PMI feedback type and so forth are defined as UCI feedback types, the feedback type for reporting BR failures may be defined separately.

Alternatively, the PUCCH for use for transmitting recovery requests following beam failures (PUCCH for beam failure recovery request transmission) may be used. In this case, a command (explicit and/or implicit indication) for judging which one of a BR failure report and a recovery request accompanying a beam failure is to be indicated may be included in the PUCCH (or UCI). Furthermore, information to show cell IDs (for example, cell IDs) may be included in the PUCCH (or UCI).

Also, after the deactivation timer expires and/or after the indication is sent to the base station, the UE may autonomously perform the deactivation operation for the certain SCell. For example, the UE may perform the deactivation operation for existing systems after receiving a deactivation command, or perform the deactivation operation for existing systems after the deactivation timer expires. The UE performs the deactivation operation autonomously, without receiving a command from the base station, so that the period until the certain SCell is deactivated can be shortened. Note that the UE may perform the deactivation operation based on a deactivation command from the base station.

The UE performs, for example, the following operations as the deactivation operation for the certain SCell. Obviously, the deactivation operation is not limited to the following operations.

Stopping PDCCH monitoring for the certain SCell (monitoring the PDCCH on/for the SCell);

Stopping transmission of SRS, PUCCH, UL data (UL-SCH) and RACH for the certain SCell;

Stopping CSI (CQI/PMI/RI/PTI) reporting for the certain SCell;

Stopping the deactivation timer for the certain SCell;

Flushing the HARQ buffer for the certain SCell; and

Stopping the RRM measurement for the certain SCell.

When receiving an indication from the UE, the base station may judge that the UE will autonomously deactivate (perform the deactivation operation) the certain SCell. Furthermore, after receiving the information about BR failures from the UE, the base station may command the UE to perform measurements for other cells (for example, other cells using the same frequency) and/or other carriers (for example, other CCs using different frequencies).

Alternatively, when receiving, from the UE, information about the measurement results of other cells and/or other carriers in addition to the information about BR failures, the base station may command addition (or activation) of other SCells based on the measurement result report from the UE. By this means, after a BR failure is reported (after the certain SCell is deactivated), it is possible to quickly configure other SCells and carry out communication.

Third Example

With a third example of the present invention, a case will be described in which the deactivation operation of a secondary cell is controlled by indicating a BR failure report from the UE to the base station based on a BR failure in the secondary cell.

Figure 6:
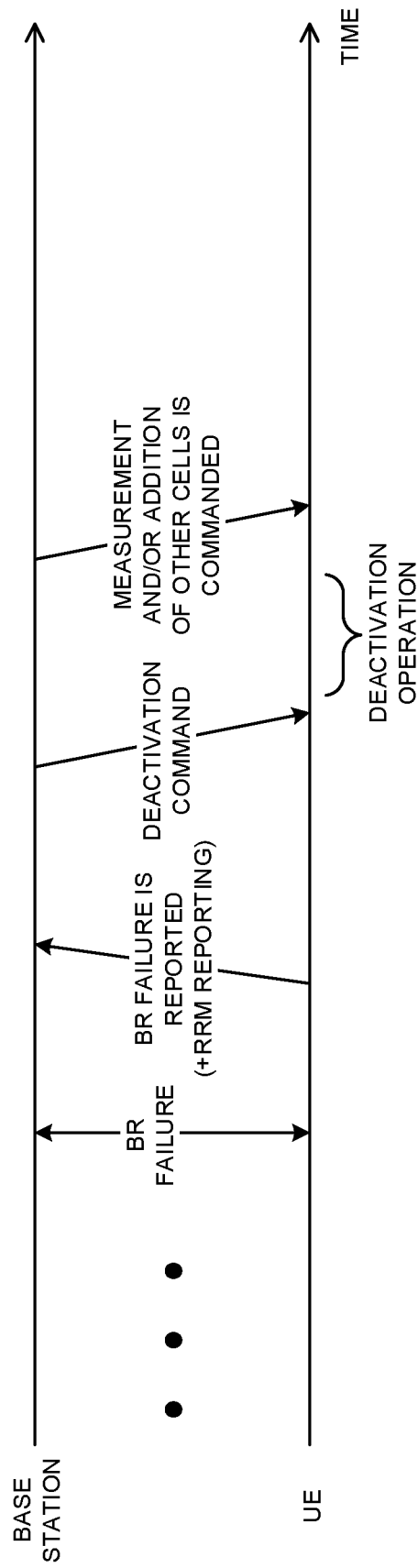
FIG. 6 is a diagram to show another example of deactivation operation in a secondary cell.

When a BR failure occurs in a certain SCell, the UE uses other cells to indicate information about the BR failure to the base station within a certain period (see FIG. 6). These other cells may be at least one of a primary cell, a PUCCH SCell, a PSCell, and other SCells that are available for use (for example, an SCell in an active state). By using other cells, it is possible not to use the certain SCell where the quality of communication is poor, and to send a report to the base station properly.

The information which the UE indicates (or reports) to the base station has only to be information about the results of BR (for example, BR failure) for the certain SCell. Alternatively, the UE may report the measurement results of other cells and/or other carriers (for example, other CCs) to the base station in addition to the information about the BR failure in the certain SCell.

The UE sends the indication (or report) to the base station by using at least one of higher layer signaling, MAC signaling and uplink control information (UCI). Note that the configuration shown in the second example above may be used for the content of the information to indicate to the base station and the method of indication to the base station.

Furthermore, whether or not the UE reports a BR failure in the certain SCell (whether or not to report) may be configured in the UE by the base station in advance. Note that the base station may be configured to specify the SCell for reporting the BR failure to the UE. By this means, the base station can individually specify the UEs and/or SCells that report BR failures, and, as a result of this, can flexibly control whether or not to report BRs.

When receiving the BR failure report of the certain SCell from the UE, the base station may command the UE to deactivate the certain SCell (or release the certain secondary cell).

For example, the base station indicates the deactivation (for example, deactivation command) for the certain SCell to the UE by using another cell. The UE may perform the deactivation operation for the certain SCell based on a command from the base station. When a BR failure occurs, the UE indicates information about the BR failure to the base station in a certain period, so that the base station side can properly determine and command deactivation of the certain SCell.

Note that, when the BR is successful, the UE may indicate the information about the BR success to the base station within the certain period. By this means, the base station side can properly determine to activate or deactivate the certain secondary cell.

Furthermore, after receiving the information about BR failures from the UE, the base station may command the UE to perform measurements for other cells and/or other carriers. These other cells may be, for example, cells to use the same frequency. These other carriers may be, for example, CCs to use different frequencies.

Alternatively, when receiving, from the UE, information about the measurement results of other cells and/or other carriers in addition to the information about BR failures, the base station may command addition (or activation) of other SCells based on the measurement result report from the UE. By this means, after a BR failure is reported (after the certain SCell is deactivated), it is possible to quickly configure other SCells and carry out communication.

Note that the command to measure and/or add other cells may be sent simultaneously with the command for the deactivation operation, or may be sent separately. When these commands are sent at the same time, the period until the UE detects other SCells can be shortened.

Fourth Example

With a fourth example of the present invention, the deactivation operation of a secondary cell is controlled based on a beam failure in the secondary cell.

As described above, in future radio communication systems, the operation for continuing communication by using different beams according to indication of a beam recovery request (BR request) in response to the beam failure is under study (see FIG. 2). Meanwhile, the situation may be assumed here in which the BR request cannot be transmitted in an SCell.

For example, when a BR request is transmitted by using a PUCCH, if a configuration is employed in which no PUCCH is configured in an SCell, no BR request can be transmitted in the SCell. Alternatively, when a BR request is transmitted by using a PRACH, if a configuration is employed in which the PRACH transmission in an SCell is controlled by PDCCH-based (PDCCH-order) triggers. no BR request can be transmitted in the SCell. Alternatively, when the number of UL serving cells is limited and the PUCCH or the PRACH based on a BR request in an SCell is not available for use, no BR request can be transmitted in the SCell.

In this way, the situation where no BR request can be transmitted in an SCell may be possible. So, with the fourth example, the deactivation operation of an SCell is controlled based on beam failure detection, instead of the results of BR. For example, control can be performed as shown in following configurations 1 to 4.

[Configuration 1]

In configuration 1, a beam failure in an SCell is not applied to a certain operation (for example, the deactivation operation and/or RLM, etc.) in this SCell. Configuration 1 may be applied by replacing the result of BR (for example, a BR failure) in the above-described first example with a beam failure.

[Configuration 2]

In configuration 2, a certain timer for an SCell is adjusted based on a beam failure in the SCell, and the deactivation operation in this SCell is controlled. To be more specific, configuration 2 may be applied by replacing the result of BR in the above-described second example with a beam failure.

[Configuration 3]

In configuration 3, a report of a beam failure is indicated from the UE to the base station based on a beam failure in an SCell, and the deactivation operation in this SCell is controlled. To be more specific, configuration may be applied by replacing the result of BR in the above-described third example with a beam failure.

[Configuration 4]

In configuration 4, when a beam failure occurs in an SCell, the UE indicates a report of the beam failure to the base station, and then the base station commands the UE to monitor other candidate beams or perform the deactivation operation.

When a beam failure occurs in a certain SCell, the UE uses other cells to indicate information about the beam failure to the base station within a certain period (see FIG. 7). These other cells may be at least one of a primary cell, a PUCCH SCell, a PSCell, and other secondary cells that are available for use (for example, a secondary cell in an active state). By using other cells, it is possible not to use the certain secondary cell where the quality of communication is poor, and to send a report to the base station.

The information which the UE indicates (or reports) to the base station has only to be information about the beam failure in the certain SCell. Note that the UE may report the information about the beam failure to the base station in the form of a beam failure recovery request.

The UE may report only the detection of the beam failure in the certain SCell to the base station. In this case, the cell index of the certain SCell where the beam failure has been detected may be indicated by a certain bit (for example, a one-bit indication).

Alternatively, when there is a new candidate beam (when a new candidate beam is detected), the UE may report information about the new candidate beam to the base station, in addition to the information about the detection of the beam failure in the certain SCell.

Alternatively, when there is no new candidate beam (when no new candidate beam is detected), the UE may report the measurement results for other cells and/or other carriers (for example, other CCs) to the base station, in addition to the information about the beam failure in the certain SCell.

The UE sends the indication (or report) to the base station by using at least one of higher layer signaling, MAC signaling and uplink control information (UCI). Note that the method shown in the second example above may be used for the content of the information to indicate to the base station and the method of indication to the base station.

Furthermore, whether or not the UE reports a beam failure in the certain SCell (whether or not to report) may be configured in the UE by the base station in advance. Note that the configuration in which an SCell that reports detection of beam failure is specified may be used. By this means, the base station can individually specify the UEs and/or SCells that report beam failures, and, as a result of this, can flexibly control whether or not to report beam failures.

Figure 7A:
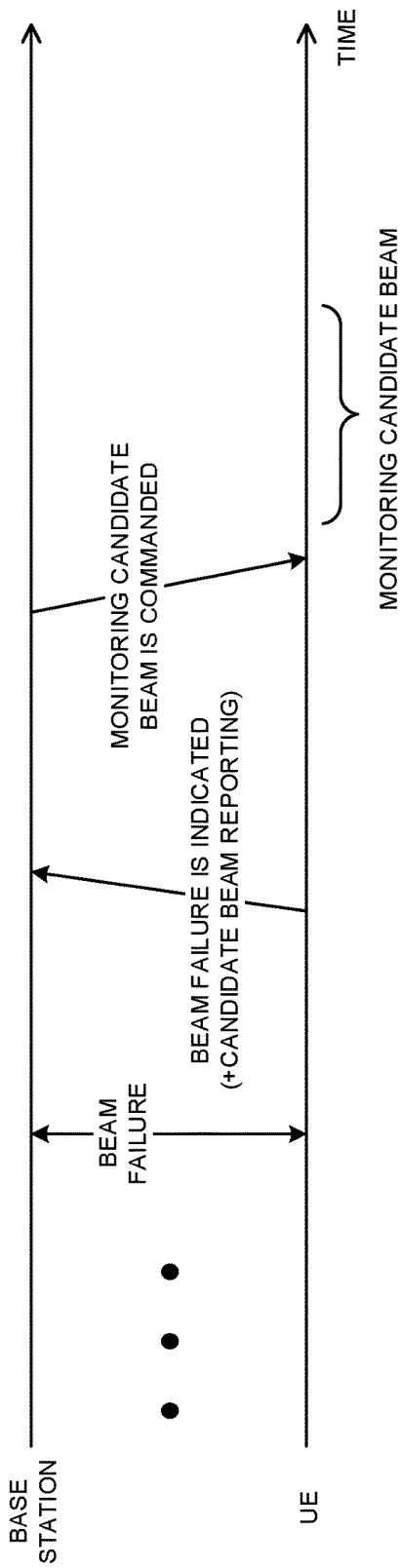
FIGS. 7A and 7B are diagrams that each show an example of operation for a secondary cell based on a beam failure.

When a beam failure indication for a certain SCell is received from the UE and there is a new candidate beam (for example, a new candidate beam is reported from the UE), the base station commands this UE to monitor the new candidate beam (see FIG. 7A). The monitoring command for the new candidate beam to the UE may be sent using other cells. By configuring a new candidate beam in this way, communication can be continued in the certain SCell by using a beam that is more suitable for the UE.

Figure 7B:
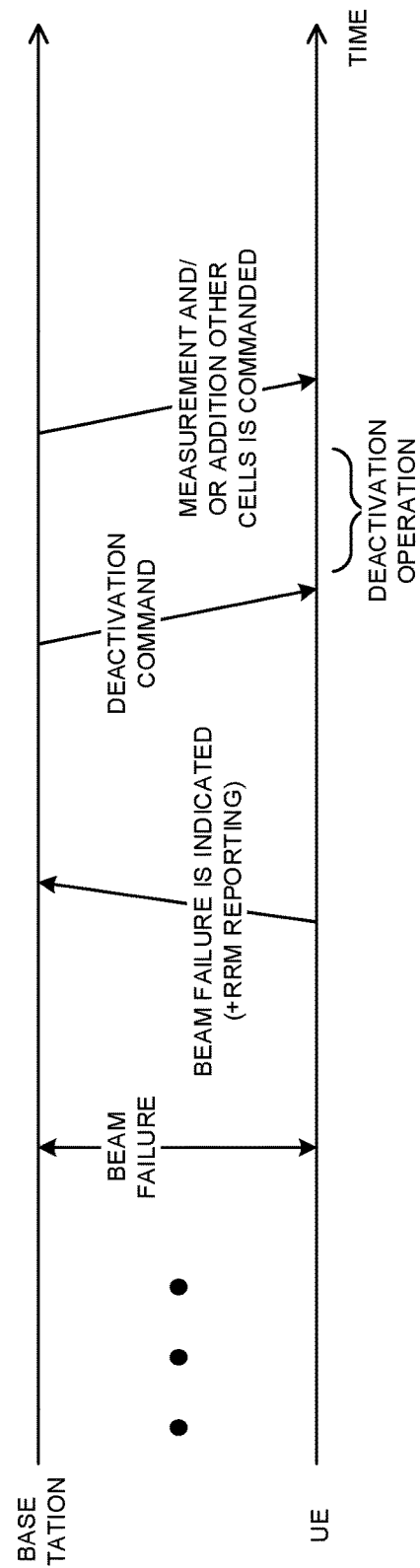

When a beam failure indication for the certain SCell is received from the UE and there is no new candidate beam (for example, no new candidate beam is reported from the UE), the base station may command the UE to deactivate the certain SCell (or release the certain secondary cell) (see FIG. 7B).

For example, the base station indicates the deactivation (for example, deactivation command) for the certain SCell to the UE by using another cell. The UE performs the deactivation operation for the certain SCell based on a command from the base station. When a BR failure occurs, the UE reports the beam failure to the base station within a certain period, so that the base station side can properly determine and command deactivation of the certain SCell.

Furthermore, after receiving the information about the beam failure from the UE, the base station may command the UE to perform measurements for other cells and/or other carriers. Note that the command for measurement may be sent simultaneously with the command for the deactivation operation, or may be sent separately. When these commands are sent at the same time, the period until the UE detects other SCells can be shortened.

Alternatively, when receiving, from the UE, information about the measurement results of other cells and/or other carriers in addition to the information about the beam failure, the base station may command addition (or activation) of other SCells based on the measurement result report from the UE. By this means, after a BR failure is reported (after the certain SCell is deactivated), it is possible to quickly configure other SCells and carry out communication.

Note that the operation in which the base station sends commands to the UE in response to the beam failure-related information reported from the UE may be referred to as a "response for a beam failure report request."

(Radio Communication System)

Now, the structure of a radio communication system according to the present embodiment will be described below. In this radio communication system, communication is performed using at least one of the above examples or a combination of them.

Figure 8:
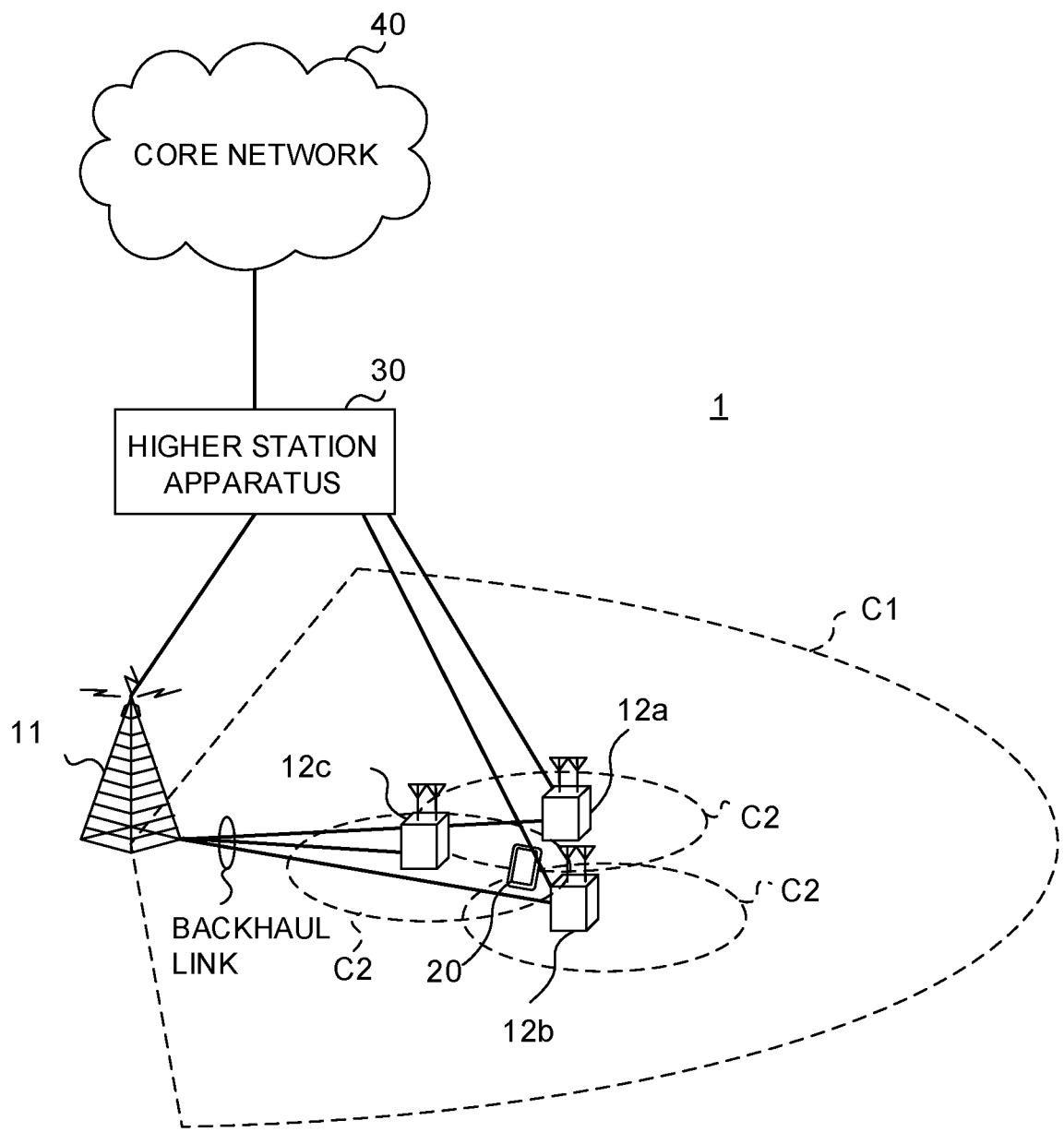
FIG. 8 is a diagram to show an exemplary schematic structure of a radio communication system according to the present embodiment.

FIG. 8 is a diagram to show an exemplary schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long-term evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 and so forth are not limited to those illustrated in the drawings.

The user terminals 20 can connect with both the radio base station 11 and the radio base stations 12. The user terminals 20 might use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a number of different numerologies may be used.

A numerology may refer to a communication parameter that is applied to transmission and/or receipt of a given signal and/or channel, and represent at least one of the subcarrier spacing, the bandwidth, the duration of symbols, the length of cyclic prefixes, the duration of subframes, the length of TTIs, the number of symbols per TTI, the radio frame configuration, the filtering process, the windowing process, and so on.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but these are by no means limiting. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a number of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The L1/L2 control channels include at least one of DL control channels (such as a PDCCH (Physical Downlink Control CHannel) and/or an EPDCCH (Enhanced Physical Downlink Control CHannel)), a PCFICH (Physical Control Format Indicator CHannel), and a PHICH (Physical Hybrid-ARQ Indicator CHannel). Downlink control information (DCI), which includes PDSCH and/or PUSCH scheduling information and so on, is communicated by the PDCCH.

Note that scheduling information may be reported in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 9:
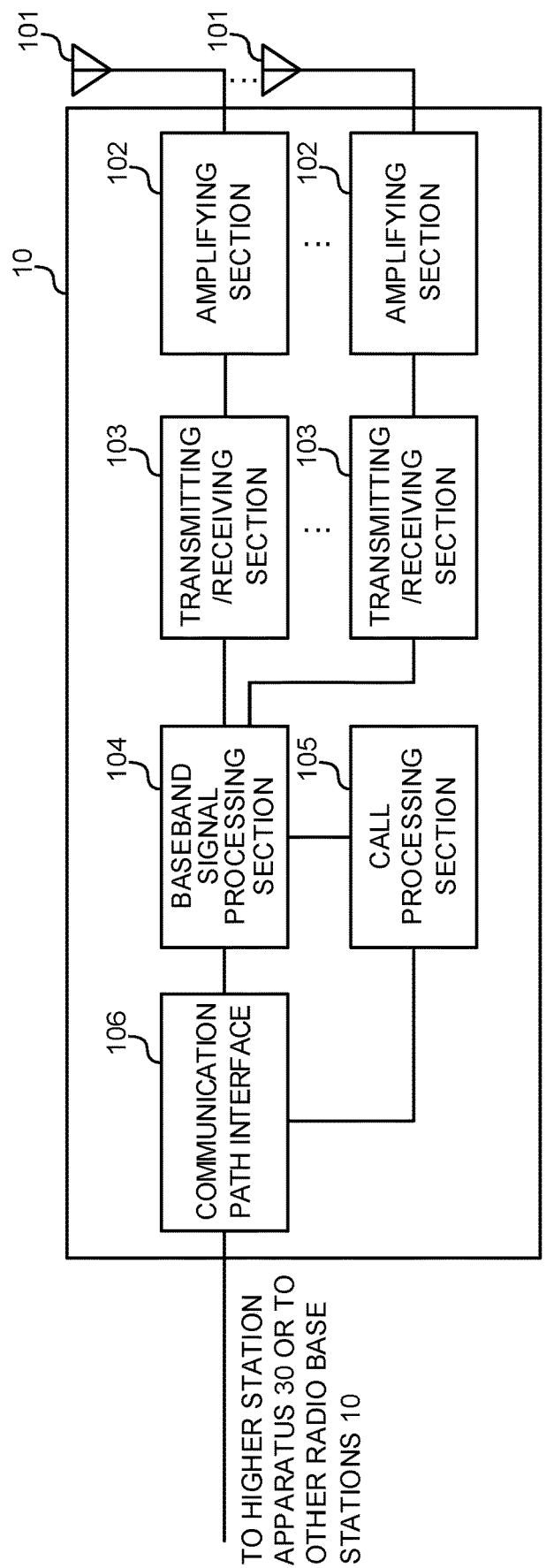
FIG. 9 is a diagram to show an exemplary overall structure of a radio base station according to the present embodiment.

FIG. 9 is a diagram to show an exemplary overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base station 10, and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are designed so that single-BF or multiple-BF operations can be used.

The transmitting/receiving sections 103 may transmit signals by using transmitting beams, or receive signals by using receiving beams. The transmitting/receiving sections 103 may transmit and/or receive signals by using certain beams determined by the control section 301.

The transmitting/receiving sections 103 receive information about a beam failure and/or a BR failure in a certain secondary cell by using other cells. Also, the transmitting/receiving sections 103 may receive the measurement results for other cells and/or other carriers. Also, the transmitting/receiving sections 103, when receiving information about a beam failure and/or a BR failure, may indicate deactivation (a deactivation command) to the UE. In addition, when receiving information about a beam failure, the transmitting/receiving sections 103 may indicate, to the UE, monitoring of other beams in a certain secondary cell and/or deactivation (a deactivation command) of the certain secondary cell.

Figure 10:
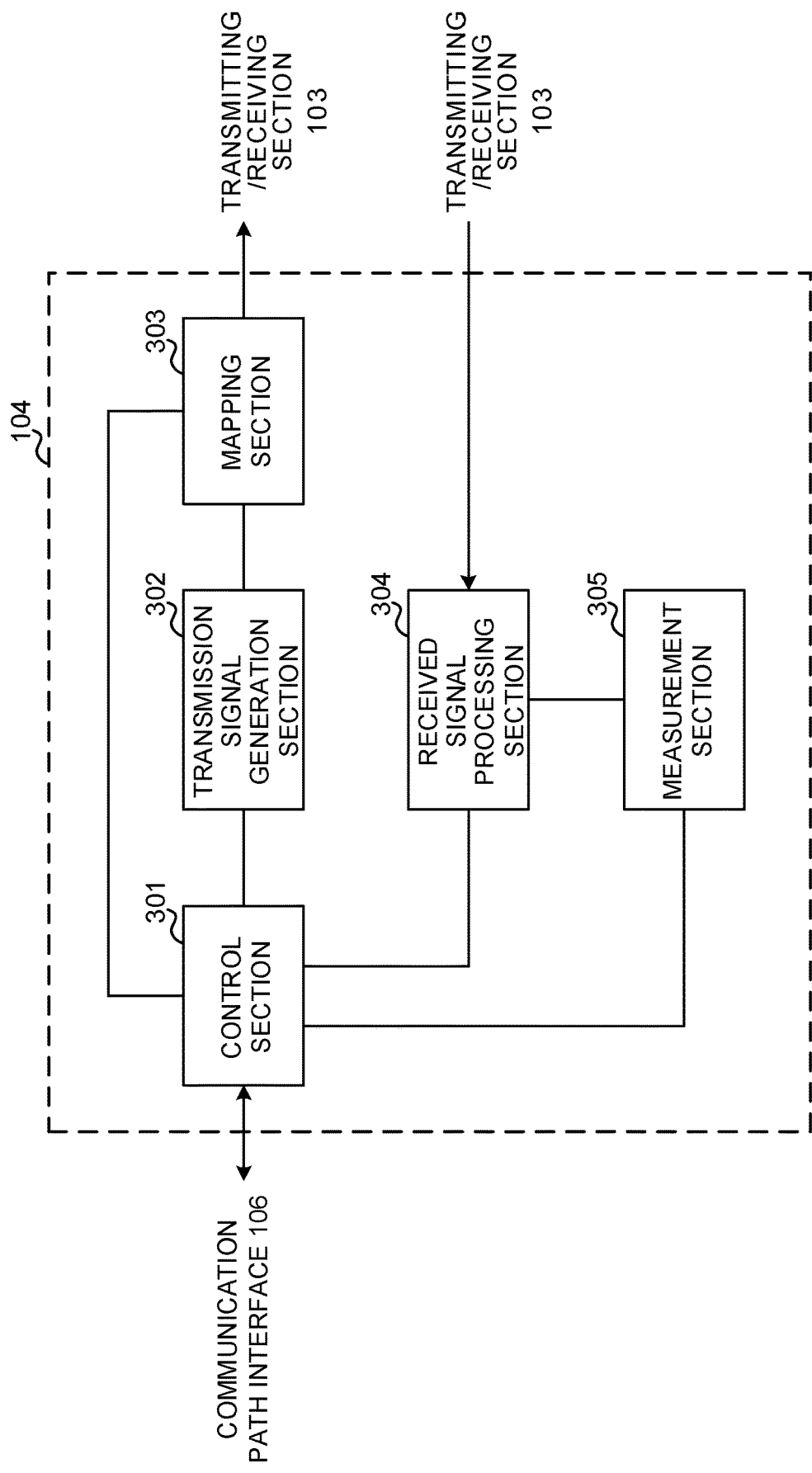
FIG. 10 is a diagram to show an exemplary functional structure of a radio base station according to the present embodiment.

FIG. 10 is a diagram to show an exemplary functional structure of a radio base station according to the present embodiment. Note that, although this example primarily shows functional blocks that pertain to characteristic parts of the present embodiment, the radio base station 10 might have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals, and so on based on the results of deciding whether or not retransmission control is necessary for uplink data signals, and so on.

The control section 301 controls scheduling of synchronization signals (for example, PSS/SSS), downlink reference signals (for example, CRS, CSI-RS, DMRS, etc.) and the like.

The control section 301 may exert control so that transmitting beams and/or receiving beams are formed by using digital BF (for example, precoding) in the baseband signal processing section 104 and/or analog BF (for example, phase rotation) in the transmitting/receiving sections 103.

The control section 301 may control radio link monitoring (RLM) and/or beam recovery (BR) for the user terminal 20.

When the control section 301 receives information about a beam failure and/or a BR failure for a certain SCell, the control section 301 may exert control so that deactivation (a deactivation command) of the certain SCell is commanded. Furthermore, when the control section 301 receives an RRM report from the UE, the control section 301 may exert control so that the UE is commanded to measure other cells and/or other carriers or the UE is commanded to add (activate) other SCells.

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates, modulation schemes and the like that are determined based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). The received signal processing section 304 can be constituted by a signal processor, a signal processing circuit or signal processing apparatus that can be described based on general understanding of the technical field to which the present invention pertains.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), transmission path information (for example, CSI) and so on. The measurement results may be output to the control section 301.

(User Terminal)

Figure 11:
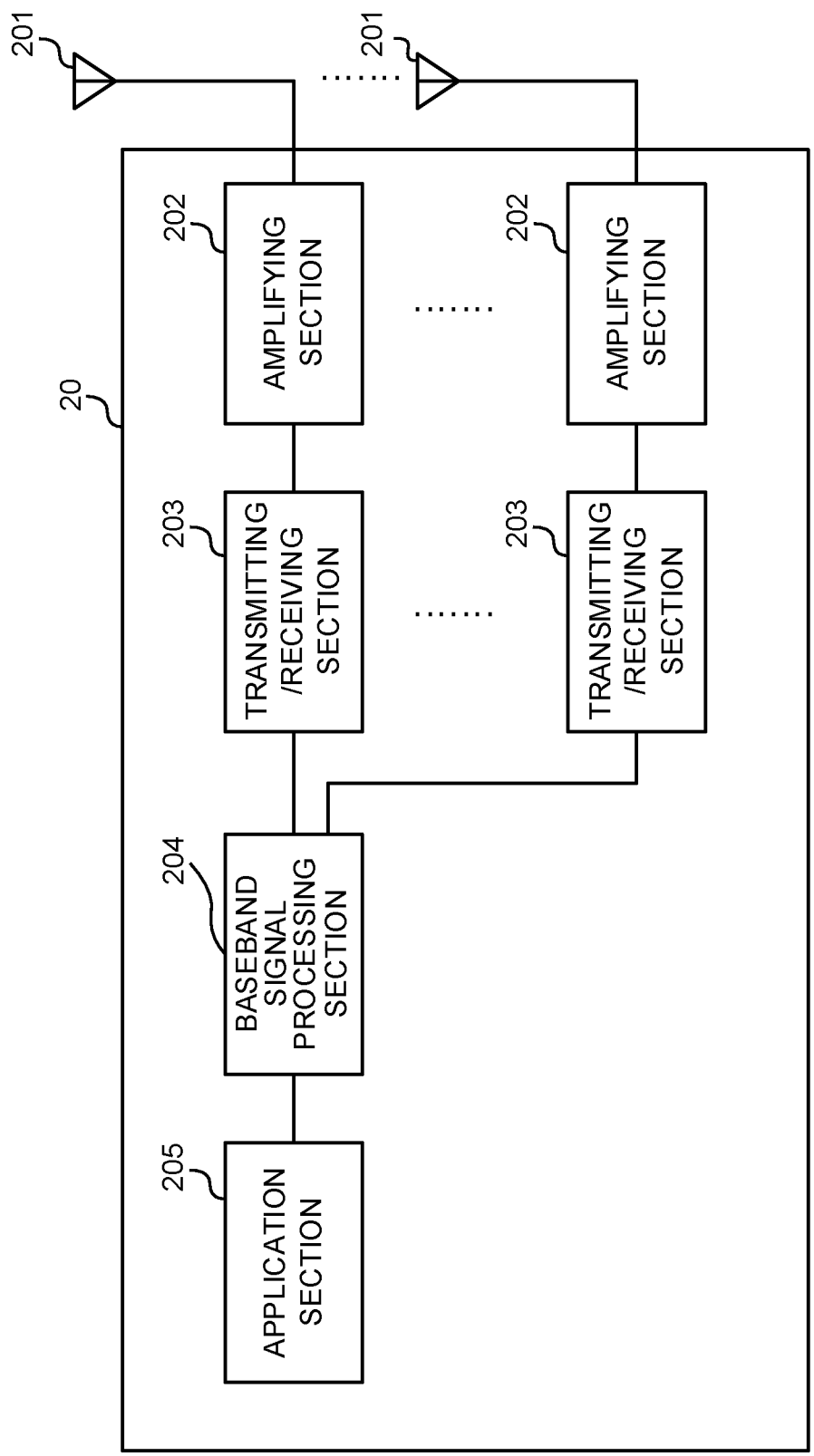
FIG. 11 is a diagram to show an exemplary overall structure of a user terminal according to the present embodiment.

FIG. 11 is a diagram to show an exemplary overall structure of a user terminal according to the present embodiment. A user terminal 20 has a number of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may further have an analog beamforming section where analog beamforming takes place. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so that single-BF and multiple-BF can be used.

The transmitting/receiving sections 203 may transmit signals by using transmitting beams, or receive signals by using receiving beams. The transmitting/receiving sections 203 may transmit and/or receive signals by using certain beams selected by the control section 401.

The transmitting/receiving sections 203 transmit information about a beam failure and/or a BR failure in a certain secondary cell by using other cells. In addition, the transmitting/receiving sections 203 may transmit the measurement results for other cells and/or other carriers. Also, the transmitting/receiving sections 203, after transmitting the information about a beam failure and/or a BR failure, may receive deactivation (a deactivation command) from the base station. Also, the transmitting/receiving sections 203 may receive a command to monitor other beams in the certain secondary cell and/or deactivate (deactivation command) the certain secondary cell, from the base station, after transmitting the information about the beam failure.

Figure 12:
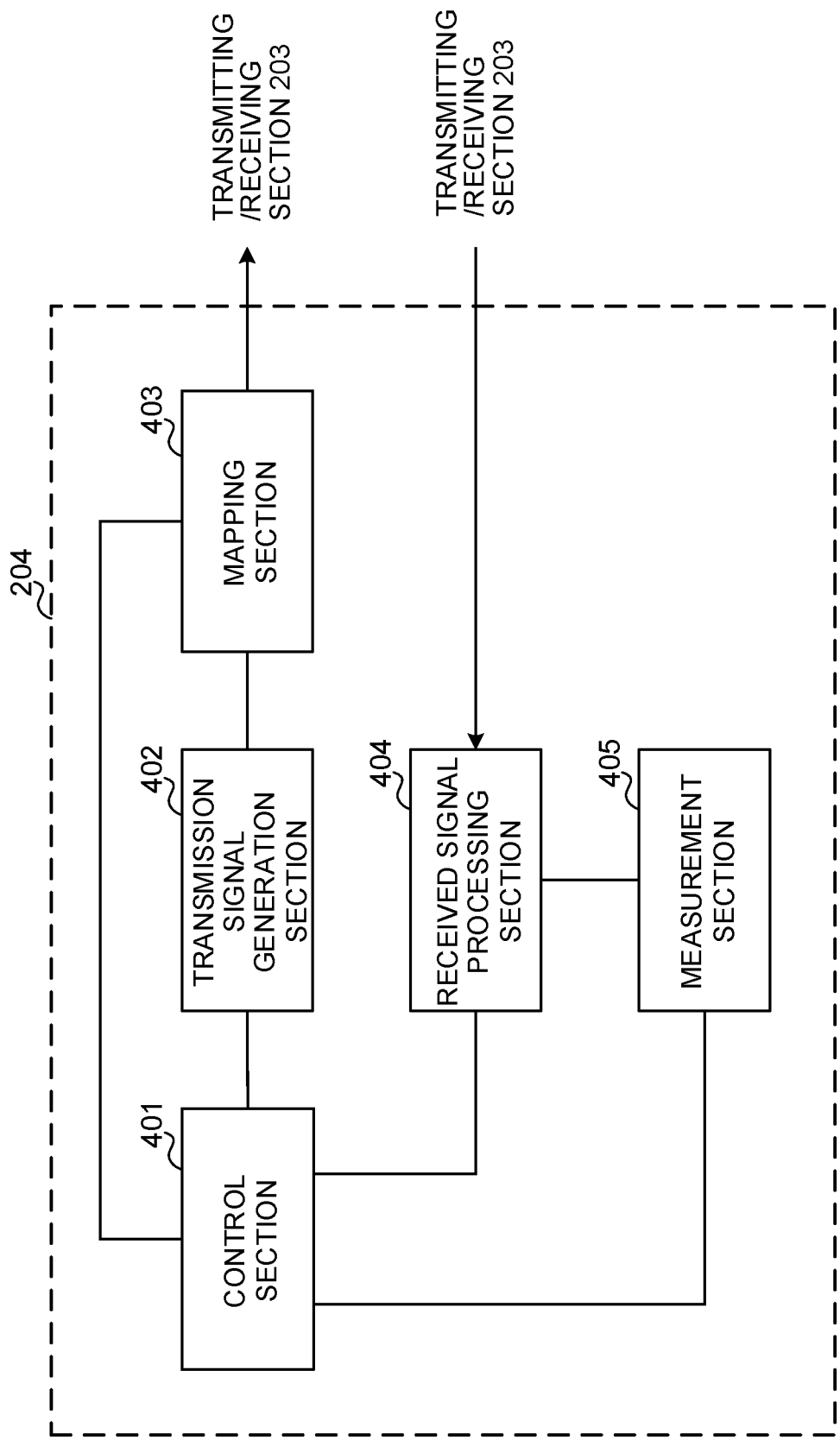
FIG. 12 is a diagram to show an exemplary functional structure of a user terminal according to the present embodiment.

FIG. 12 is a diagram to show an exemplary functional structure of a user terminal according to the present embodiment. Note that, although this example primarily shows functional blocks that pertain to characteristic parts of present embodiment, the user terminal 20 might have other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

The control section 401 may exert control so that transmitting beams and/or receiving beams are formed by using digital BF (for example, precoding) in the baseband signal processing section 204 and/or by using analog BF (for example, phase rotation) in the transmitting/receiving sections 203.

The control section 401 may control radio link monitoring (RLM) and/or beam recovery (BR) based on measurement results in the measurement section 405.

The control section 401 controls adjusting the deactivation timer for a certain secondary cell and/or reporting of beam failures and/or BR failures in the certain secondary cell, based on beam failures and/or the results of BR in the certain secondary cell. For example, when a beam failure and/or a BR failure occur in a certain secondary cell, the control section 401 may control to change or expire the counter value on the deactivation timer (see FIG. 3 and FIG. 4).

After a beam failure and/or a BR failure occur in a certain secondary cell and information about the beam failure and/or the BR failure is transmitted, the control section 401 may control the deactivation operation of the certain cell based on a command indicated from the base station (see FIG. 6).

After a beam failure occurs in a certain secondary cell and information about this beam failure is transmitted, the control section 401 may control monitoring of other beams in the certain secondary cell and/or the deactivation operation of the certain secondary cell, based on the information indicated from the base station (see FIG. 7). Alternatively, the control section 401 may assume that no configuration for performing BR operation is configured in the secondary cell.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generation apparatus that can be described based on general understanding of the technical field to which the present invention pertains.

For example, the transmission signal generation section 402 generates uplink control signals such as delivery acknowledgment information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present disclosure.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Structure)

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 13:
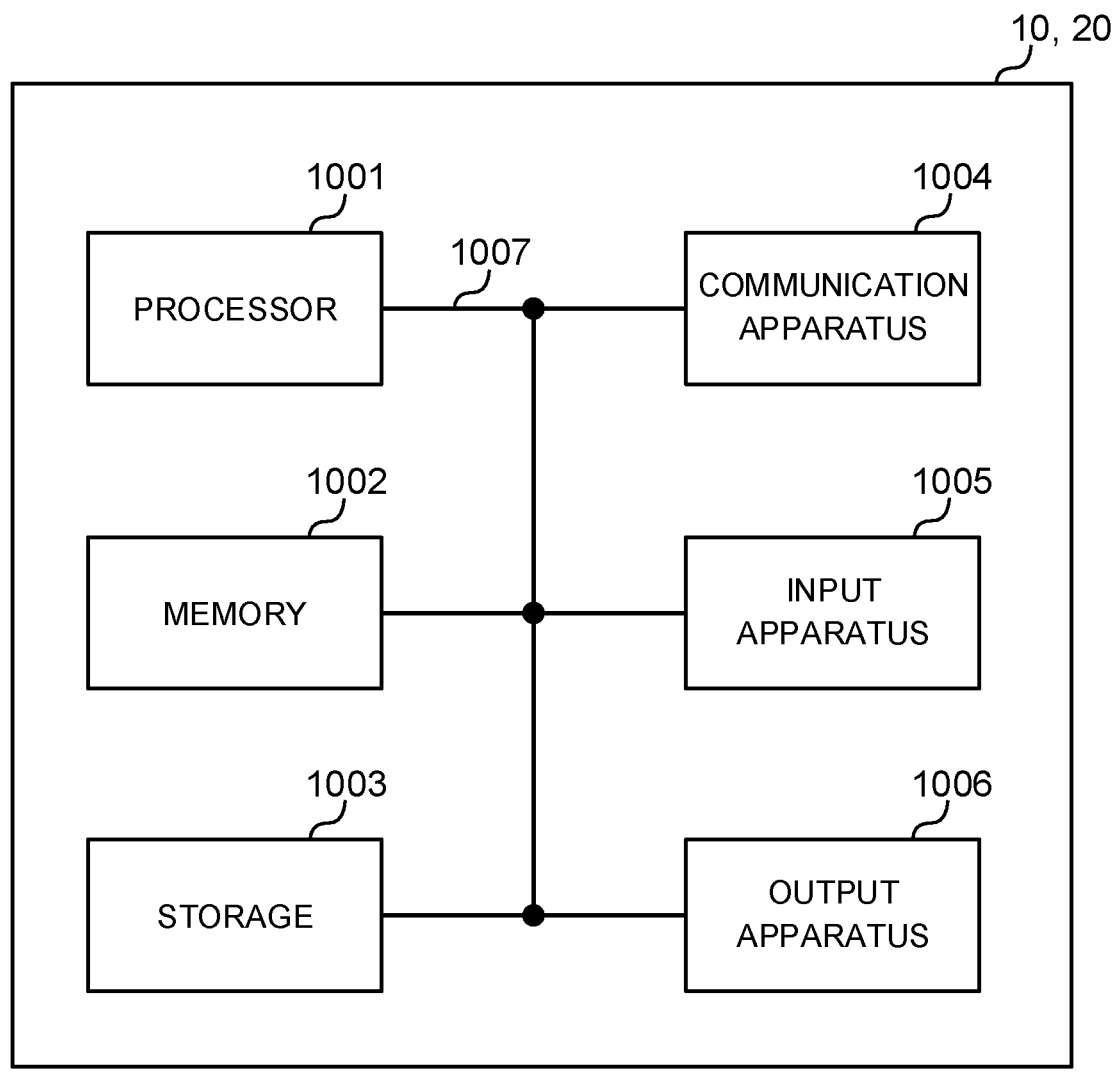
FIG. 13 is a diagram to show an exemplary hardware structure of a radio base station and a user terminal according to the present embodiment.

For example, the radio base station, user terminals, and so on according to the present embodiment may function as a computer that executes the processes of each example of the present embodiment. FIG. 13 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. The hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read certain software (programs), and allowing the processor 1001 to do calculations, control communication that involves the communication apparatus 1004, control the reading and/or writing of data in the memory 1002 and the storage 1003, and so on.

The processor 1001 may control the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of a user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and so on for implementing the radio communication methods according to the present embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on, in order to implement, for example, frequency division duplex (FDD)

and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for executing output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, "channels" and/or "symbols" may be replaced by "signals" (or "signaling"). Also, a signal may be a message. A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or one minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the length of symbols, the length of cyclic prefix (CP), and so on can be variously changed.

Also, the information and parameters described in this specification may be represented in absolute values or in relative values with respect to certain values, or may be represented using other applicable information. For example, a radio resource may be indicated by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent in an implicit way (for example, by not reporting this piece of information, or by reporting another piece of information).

Decisions may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, the examples/embodiments of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed to communicate with terminals can be performed by base stations, one or more network nodes (for example, MMEs (Mobility Management Entities), S-GWs (Serving-Gateways) and so on may be possible, but these are not limiting) other than base stations, or combinations of these.

The examples/embodiments illustrated in this specification may be used individually or in combinations, which may be switched depending on the mode of implementation. The order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long-term evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark)(Global System for Mobile communications), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. It follows that reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgments and determinations related to calculating, computing, processing, deriving, investigating, looking up (for example, searching a table, a database, or some other data structure), ascertaining, and so on. Furthermore, to "judge" and "determine" as used in the present disclosure may be interpreted as meaning making judgments and determinations related to receiving (for example, receiving information), transmitting (for example, transmitting information), inputting, outputting, accessing (for example, accessing data in a memory) and so on. In addition, to "judge" and "determine" as used in the present disclosure may be interpreted as meaning making judgments and determinations related to resolving, selecting, choosing, establishing, comparing, and so on. In other words, to "judge" and "determine" as used in the present disclosure may be interpreted as meaning making judgments and determinations with regard to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted likewise.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a transmitter that, when beam failure is detected in a secondary cell, transmits to a base station, by using Media Access Control Control Element (MAC CE), information indicating a cell in which the beam failure is detected and information about candidate beams, as information about the beam failure; and
a processor that, when receiving an indication from the base station, controls monitoring with the candidate beams for beam recovery.

2. The terminal according to claim 1, wherein the transmitter transmits a recovery request by using an uplink control channel, in a primary cell or in a primary secondary cell.

3. The terminal according to claim 1, wherein, when beam failure is detected in the secondary cell specified by the base station, the transmitter transmits information about the beam failure to the base station.

4. A radio communication method for a terminal, the method comprising:
when beam failure is detected in a secondary cell, transmitting to a base station, by using Media Access Control Control Element (MAC CE), information indicating a cell in which the beam failure is detected and information about candidate beams, as information about the beam failure; and
when receiving an indication from the base station, controlling monitoring with the candidate beams for beam recovery.

5. A base station comprising:
a receiver that, when beam failure is detected in a secondary cell, receives from a terminal, by using Media Access Control Control Element (MAC CE), information indicating a cell in which the beam failure is detected and information about candidate beams, as information about the beam failure; and
a transmitter that transmits an indication to the terminal, wherein the terminal controls monitoring with the candidate beams for beam recovery.

6. A system comprising a terminal and a base station, wherein the terminal comprises:
- a transmitter of the terminal that, when beam failure is detected in a secondary cell, transmits to the base station, by using Media Access Control Control Element (MAC CE), information indicating a cell in which the beam failure is detected and information about candidate beams, as information about the beam failure; and
- a processor that, when receiving an indication from the base station, controls monitoring with the candidate beams for beam recovery, and the base station comprises:
- a receiver that receives the information about the beam failure from the terminal; and
- a transmitter of the base station that transmits the indication to the terminal.

\* \* \* \* \*